US012775910B2

(12) United States Patent
Yang et al.

(10) Patent No.: US 12,775,910 B2
(45) Date of Patent: Oct. 27, 2026

(54) SUPPLIES COUNTING METHOD AND APPARATUS, AND DEVICE AND STORAGE MEDIUM

(71) Applicant: Beijing Jingdong Zhenshi Information Technology Co., Ltd., Beijing (CN)

(72) Inventors: Wenxiang Yang, Beijing (CN); Meng Chen, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 348 days.

(21) Appl. No.: 18/574,422

(22) PCT Filed: Jun. 20, 2022

(86) PCT No.: PCT/CN2022/099785
§ 371 (c)(1),
(2) Date: Dec. 27, 2023

(87) PCT Pub. No.: WO2023/020105
PCT Pub. Date: Feb. 23, 2023

(65) Prior Publication Data

US 2024/0289743 A1 Aug. 29, 2024

(30) Foreign Application Priority Data

Aug. 20, 2021 (CN) ......................... 202110960544.2

(51) Int. Cl.
*G06Q 10/087* (2023.01)

(52) U.S. Cl.
CPC .................................. *G06Q 10/087* (2013.01)

(58) Field of Classification Search
CPC .. G06Q 10/087; G06Q 10/08; G06K 17/0029; G06K 17/0025

(Continued)

(56) References Cited

U.S. PATENT DOCUMENTS

2018/0293543 A1* 10/2018 Tiwari .................... H04W 4/35
2020/0034780 A1 1/2020 Sikka et al.

(Continued)

FOREIGN PATENT DOCUMENTS

CN 103984346 A * 8/2014
CN 108876242 A 11/2018

(Continued)

OTHER PUBLICATIONS https://en.wiktionary.org/wiki/statisticize.*

(Continued)

*Primary Examiner* — Russell S Glass
(74) *Attorney, Agent, or Firm* — Ice Miller, LLP; Justin Swindells; Brian Lum

(57) ABSTRACT

The present disclosure relates to the field of warehousing logistics. Provided are a supplies counting method and apparatus, and a device and a storage medium. An implementation solution involves: in response to receiving a counting task for supplies in a warehouse, determining a goods grid in which a material container corresponding to the counting task is located; sending the goods grid, in which the material container is located, to a target automated guided vehicle, so that the target automated guided vehicle performs path planning and then acquires identifiers of materials in the material container; in response to receiving the identifiers of the materials in the material container that are sent by the target automated guided vehicle, performing statistics on the identifiers; and comparing a statistical result with a storage result of the materials in the material container, and determining a supplies counting result according to a comparison result.

15 Claims, 6 Drawing Sheets

(58) Field of Classification Search
USPC .............................................................. 705/28
See application file for complete search history.

(56) References Cited

U.S. PATENT DOCUMENTS

| | | | | |
|---|---|---|---|---|
| 2020/0140197 | A1 | 5/2020 | Yan | |
| 2023/0373722 | A1* | 11/2023 | Eckman | B65G 1/1375 |

FOREIGN PATENT DOCUMENTS

| | | | | | |
|---|---|---|---|---|---|
| CN | 109264275 | A | * | 1/2019 | G06K 17/0025 |
| CN | 110084333 | A | | 8/2019 | |
| CN | 110303500 | A | * | 10/2019 | B25J 9/1602 |
| CN | 111027912 | A | | 4/2020 | |
| CN | 111144825 | A | | 5/2020 | |
| CN | 111415110 | A | | 7/2020 | |
| CN | 111461583 | A | | 7/2020 | |
| CN | 111620032 | A | * | 9/2020 | B65G 1/1376 |
| CN | 112507820 | A | | 3/2021 | |
| CN | 113222457 | A | | 8/2021 | |
| CN | 113657833 | A | | 11/2021 | |
| JP | 2004-238126 | A | | 8/2004 | |

OTHER PUBLICATIONS

Extended European Search Report issued in corresponding EP Application No. 22857418.2 mailed Jun. 25, 2025.
Office Action issued in Chinese Application No. 202110960544.2, mailed Jun. 19, 2023 [8 pages].
Liu Chang, "Path planning and implementation of automatic guided truck for warehouse materials," Information Technology and Informatization, Issue 9, 2020 (Chinese and English versions) [6 pages].
International Search Report (and translation) & Written Opinion issued in PCT/CN2022/099785, mailed Aug. 26, 2022 [9 pages].
Tao, F., et al., "Impact of RFID technology on inventory control policy", Journal of the Operational Research Society, Sep. 27, 2016, 68:207-220.
Honghua, P., "Solution of Automatic Warehouse Management System Based on RFID", Logistics Technology, Mar. 26, 2013, 32(19):259-261 (English abstract only).

* cited by examiner

SUPPLIES COUNTING METHOD AND APPARATUS, AND DEVICE AND STORAGE MEDIUM

CROSS-REFERENCE TO RELATED APPLICATIONS

This patent application is a national stage of International Application No. PCT/CN2022/099785, filed on Jun. 20, 2022, which claims the priority from Chinese Patent Application No. 202110960544.2, filed on Aug. 20, 2021. Both of the aforementioned applications are hereby incorporated by reference in their entireties.

TECHNICAL FIELD

The present disclosure relates to the field of computer technology, particularly to the field of warehousing management, and more particularly to a method, apparatus and device for counting supplies and a storage medium.

BACKGROUND

With the rapid development of e-commerce, in order to improve the efficiency of warehousing operations and enhance customer experience, the degree of warehouse automation is getting higher and higher. In the clothing industry, with the continuous upgrading of brands, the number of clothing categories for which unique RFID (radio frequency identification) tags are selected to perform whole-process tracing is growing. Each commodity is bound to commodity-related information by using an RFID tag, which further creates a better prerequisite for the whole-process automation operation inside a clothing warehouse.

However, at present, the counting for the clothes with RFID tags in warehouses in the industry is mainly performed by manually scanning commodities using a RFID gun, or the counting for the commodities with the RFID tags is implemented by equipping a drone with an RFID reader, resulting in a low efficiency in counting supplies.

SUMMARY

A method, apparatus and device for counting supplies, and a storage medium are provided.

At a first aspect, some embodiments of the present disclosure provide a method for counting supplies. The method comprises: determining, in response to receiving a counting task for supplies in a warehouse, a goods grid where a material container corresponding to the counting task is; sending the goods grid where the material container is to a target automated guided vehicle (AGV), for the target AGV to perform path planning and acquire identifiers of materials in the material container; statisticizing, in response to receiving the identifiers of the materials in the material container that are sent by the target AGV, the identifiers to obtain a statistical result; and comparing the statistical result with a storage result of the materials in the material container and determining a supplies counting result according to a result of the comparing.

At a first aspect, some embodiments of the present disclosure provide an apparatus for counting supplies. The apparatus includes: a goods grid determining unit, configured to determine, in response to receiving a counting task for supplies in a warehouse, a goods grid where a material container corresponding to the counting task is; a first position sending unit, configured to send the goods grid where the material container is to a target automated guided vehicle (AGV), for the target AGV to perform path planning and acquire identifiers of materials in the material container; an identifier statisticizing unit, configured to statisticize, in response to receiving the identifiers of the materials in the material container that are sent by the target AGV, the identifiers to obtain a statistical result; and a supplies counting unit, configured to compare the statistical result with a storage result of the materials in the material container and determine a supplies counting result according to a result of the comparing.

At a third aspect, some embodiments of the present disclosure provide an electronic device for counting supplies. The electronic device includes: at least one processor; and a memory, in communication with the at least one processor, where the memory stores instructions executable by the at least one processor, and the instructions are executed by the at least one processor, to enable the at least one processor to perform the method according to the first aspect.

At a fourth aspect, some embodiments of the present disclosure provide a non-transitory computer readable storage medium, storing a computer instruction, wherein the computer instruction is used to cause the computer to perform the method according to the first aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Example embodiments of the present disclosure are described below in combination with the accompanying drawings, and various details of the embodiments of the present disclosure are included in the description to facilitate understanding, and should be considered as example only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that embodiments in the present disclosure and the features in the embodiments may be combined with each other on a non-conflict basis. Embodiments of the present disclosure will be described below in detail with reference to the accompanying drawings.

Figure 1:
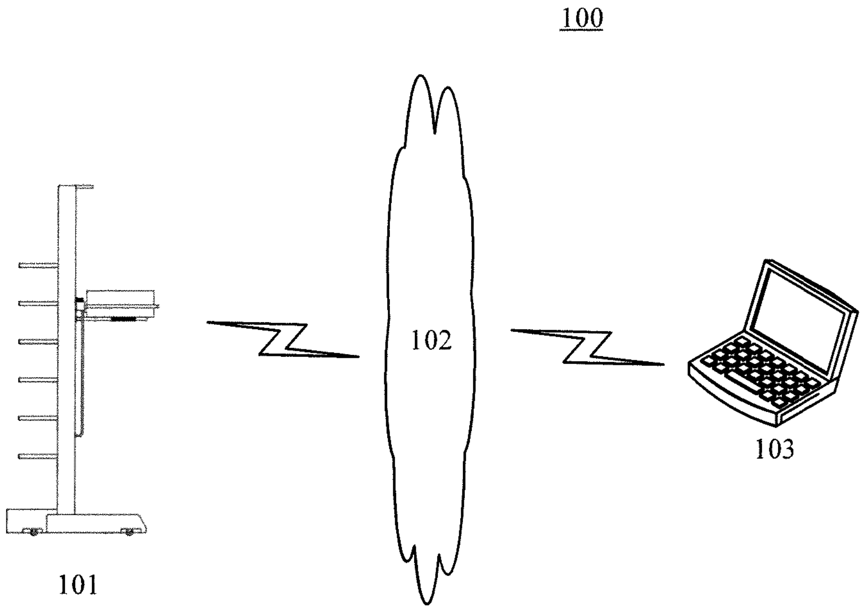
FIG. 1 is a diagram of an example system architecture in which an embodiment of the present disclosure may be applied.

FIG. 1 illustrates an example system architecture 100 in which a method for counting supplies or an apparatus for counting supplies according to embodiments of the present disclosure may be applied.

As shown in FIG. 1, the system architecture 100 may include an AGV (AGV) 101 running in a warehouse, a network 102 and a terminal device 103. The network 102 serves as a medium providing a communication link between the AGV 101 and the terminal device 103. The network 104 may include various types of connections, for example, wired or wireless communication links, or optical fiber cables.

The AGV 101 may receive a transport task sent by the terminal device 103 and perform the transport task, that is, transport a material container stored on a storage location of a rack in the warehouse to a designated position. Various materials such as clothes and books may be stored in the above material container. The materials may be provided with electronic tags. The material container may be placed on the storage location of the rack. The AGV 101 can carry the material container from the storage location of the rack. The AGV 101 may be provided with a card reader for reading the electronic tags of the materials in the material container.

A user may interact with the AGV 101 through the terminal device 103, for example, may receive the identifier of a material in the material container that is sent by the AGV 101, or send the position of a storage location, counting task information, etc. to the AGV 101.

The terminal device 103 may be hardware or software. When being the hardware, the terminal device 103 may be various electronic devices, including, but not limited to, a smartphone, a tablet computer, a laptop portable computer, a desktop computer, etc. . . . When being the software, the terminal device 103 may be installed in the above listed electronic devices. The terminal device may be implemented as a plurality of pieces of software or a plurality of software modules (e.g., software or software modules for providing a distributed service), or as a single piece of software or a single software module, which will not be specifically defined here.

It should be noted that the method for counting supplies provided by embodiments of the present disclosure is generally performed by the terminal device 103. Correspondingly, the apparatus for counting supplies is generally provided in the terminal device 103.

It should be appreciated that the numbers of the AGVs, the networks and the terminal devices in FIG. 1 are merely illustrative. Any number of AGVs, networks and terminal devices may be provided based on actual requirements.

Figure 2:
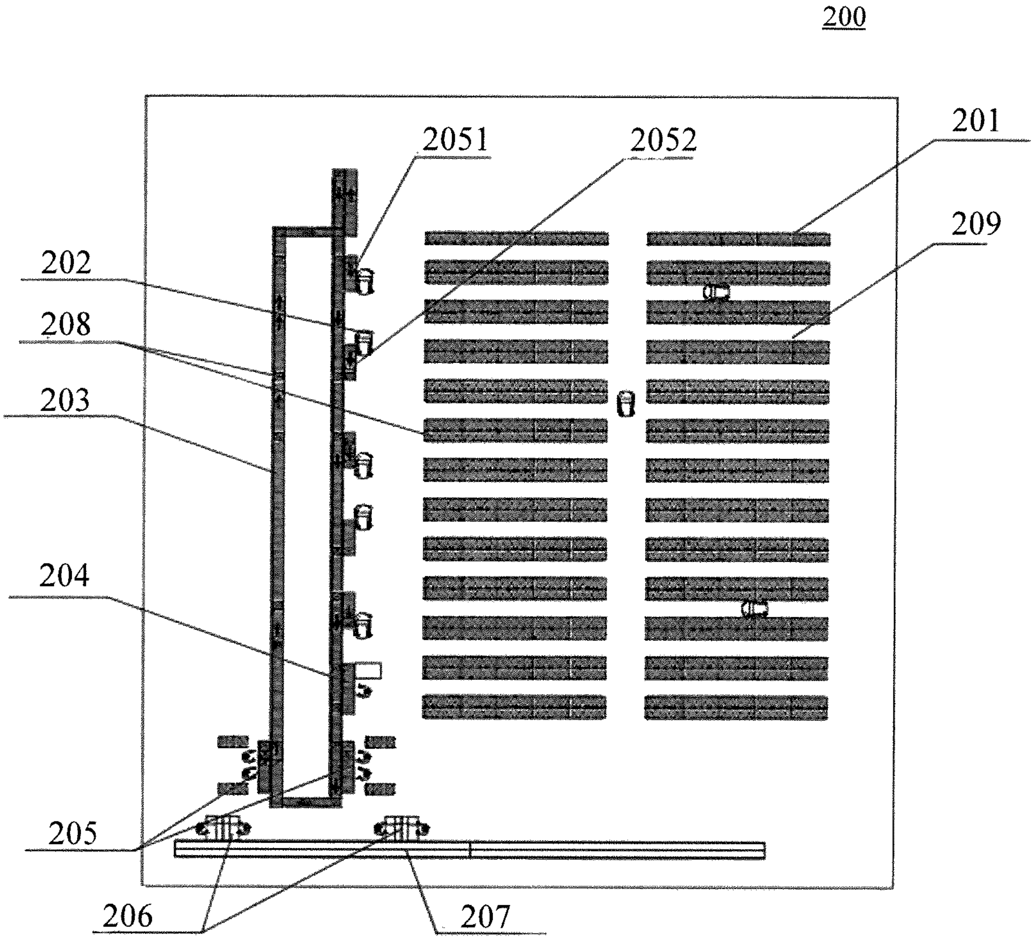
FIG. 2 is a schematic layout diagram of a warehouse applied to an embodiment of the present disclosure.

FIG. 2 is a schematic layout diagram of a warehouse to which the method for counting supplies or the apparatus for counting supplies according to embodiments of the present disclosure may be applied. As shown in FIG. 2, the warehouse in this embodiment may include a unit rack 201, an AGV 202, a roller conveyor line 203, a counting workstation 204, a picking workstation 205, a packaging workstation 206, and a package conveyor line 207. Here, the picking workstation 205 may further include a picking stock-in temporary storage location 2051 and a picking stock-out temporary storage location 2052. The unit rack 201 may include a plurality of storage locations, and one material container 208 is placed on each storage location. The material container may be a material basket, a transfer box, or the like. A lane way 209 may be formed between two unit racks 201, and an AGV 202 may travel on the lane way to transport a material container. The AGV 202 may transport the material container to the roller conveyor line 203, and the roller conveyor line 203 may transport the material container to the counting workstation 204, the picking workstation 205 and the packaging workstation 206. The worker at the counting workstation 204 may count the material(s) in the material container. The worker at the picking workstation 205 may perform picking on the material(s) in the material container. The worker at the packaging workstation 206 may package a material and place the packaged package on the package conveyor line 207 to transport the package.

Figure 3:
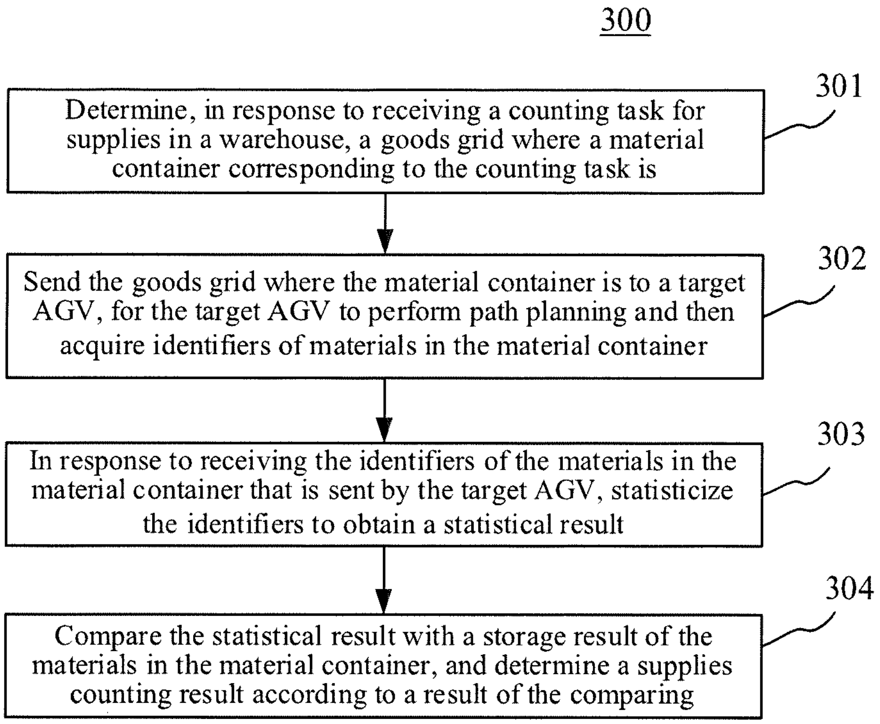
FIG. 3 is a flowchart of a method for counting supplies according to an embodiment of the present disclosure.

Further referring to FIG. 3, FIG. 3 illustrates a flow 300 of a method for counting supplies according to an embodiment of the present disclosure. The method for counting supplies in this embodiment includes the following operations.

Step 301, determining, in response to receiving a counting task for supplies in a warehouse, a goods grid where a material container corresponding to the counting task is.

In this embodiment, an executing body of the method for counting supplies may receive the counting task for the supplies in the warehouse. The above counting task may include the goods grid where the material container is. The executing body may analyze the counting task to determine the goods grid where the material container in which the material to be counted this time is.

Step 302, sending the goods grid where the material container is to a target automated guided vehicle (AGV), for the target AGV to perform path planning and then acquire identifiers of materials in the material container.

After determining the goods grid where the material container is, the executing body may send the above goods grid to the target AGV. Here, the target AGV may be a currently idle AGV. The executing body may acquire the states of AGVs in the warehouse in real time, thereby determining which AGVs are idle and which AGVs are busy. After receiving the goods grid where the above material container is, the target AGV may convert the position of the goods grid to the coordinate system where the AGV is. In this way, the target AGV may perform the path planning. The target AGV may travel along a planned path to the lane way corresponding to the goods grid where the material container is, and may control the mechanical arm of the target AGV to take the material container out of the goods grid after traveling to the position corresponding to the above goods grid.

In this embodiment, the target AGV may read the identifiers of the materials in the material container by various means. For example, the target AGV may acquire the identifiers by reading the electronic tags of the materials in the material container through an installed card reader, or determine the identifiers by collecting image(s) of the materials in the material container through an installed image collection apparatus.

Step 303, statisticizing, in response to receiving the identifiers of the materials in the material container that are sent by the target AGV, the identifiers to obtain a statistical result.

After receiving the identifiers of the materials in the material container that are sent by the target AGV, the executing body may statisticize the identifiers. That is, the executing body needs to determine the number of materials having the same identifiers. For example, the number of clothes of a model A1 and a size B1 is k1, the number of clothes of the model A1 and a size B2 is k2, and so on.

Step 304, comparing the statistical result with a storage result of the materials in the material container, and determining a supplies counting result according to a result of the comparing.

The executing body may compare the above statistical result with the storage result of the materials in the material container. If the two results are consistent, it is considered that the storage result is correct, and accordingly, the counting ends, and corresponding prompt information may be outputted at the same time. If the two results are inconsistent, it is considered that there is a difference between the storage result and the statistical result, and accordingly, corresponding prompt information may be outputted, a recounting task may be generated, or the like.

According to the method for counting supplies provided in the above embodiment of the present disclosure, the supplies in the warehouse can be quickly counted, thereby improving the efficiency of counting the supplies.

Figure 4:
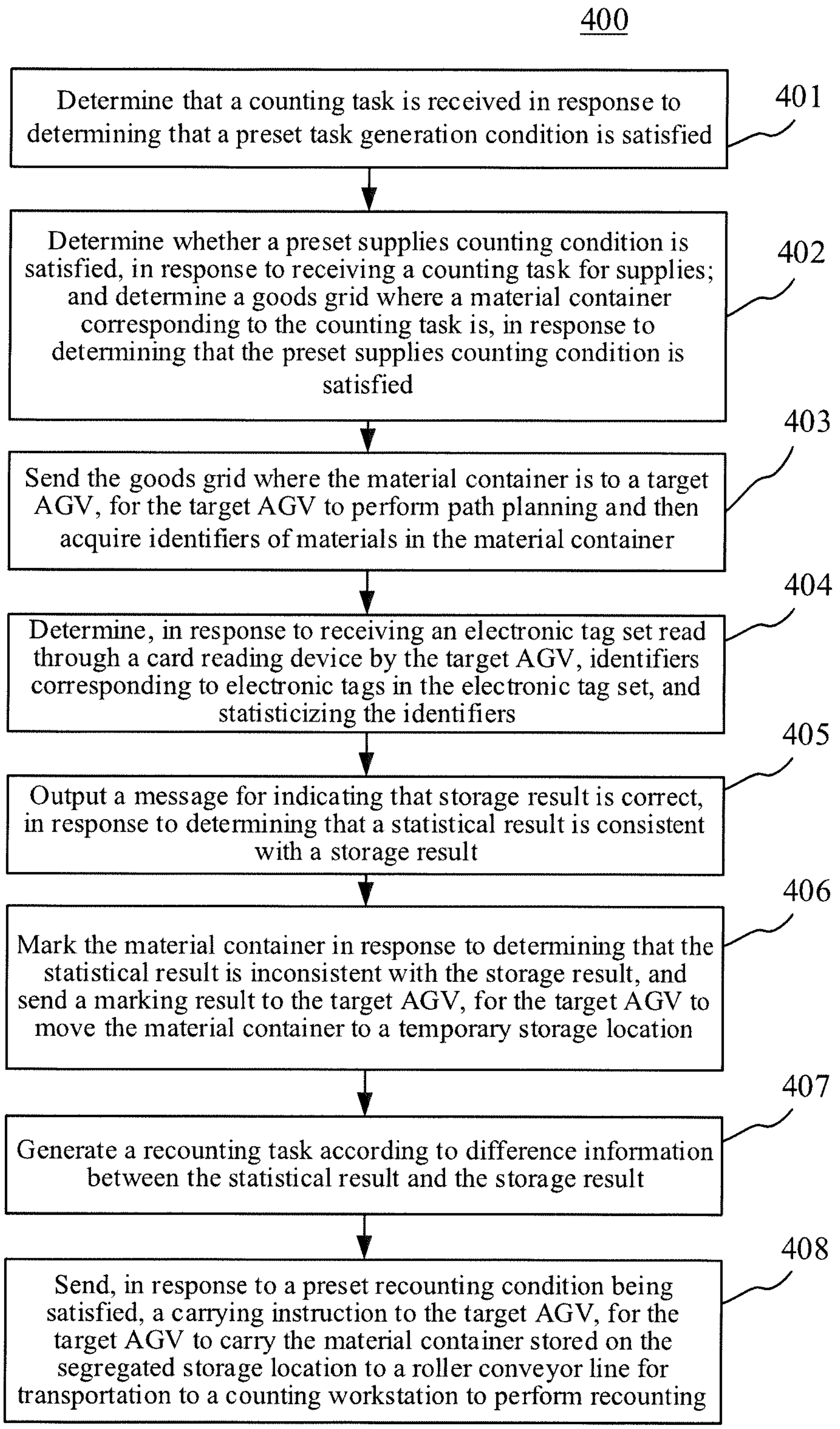
FIG. 4 is a flowchart of the method for counting supplies according to another embodiment of the present disclosure.

Further referring to FIG. 4, FIG. 4 illustrates a flow 400 of a method for counting supplies according to another embodiment of the present disclosure. As shown in FIG. 4, the method in this embodiment may include the following steps.

Step 401, determining that a counting task is received in response to determining that a preset task generation condition is satisfied.

In this embodiment, the executing body may detect, in real time, whether the preset task generation condition is satisfied. If the preset task generation condition is satisfied, that the counting task is received is determined. Here, the preset task generation condition may refer to reaching a preset moment, a preset length of time elapsed since the last counting task is generated, or the like.

Step 402, in response to receiving the counting task for supplies, determining whether a preset supplies counting condition is satisfied; and in response to determining that the preset supplies counting condition is satisfied, determining a goods grid where a material container corresponding to the counting task is.

If the executing body confirms that the counting task for the supplies is received, the executing body may further determine whether the preset supplies counting condition is satisfied. The above preset supplies counting condition may include, but not limited to, reaching a preset moment, the number of workers in a warehouse being less than a preset threshold, and the like. If the preset supplies counting condition is satisfied, the counting task is further analyzed, to determine the goods grid where the corresponding material container is.

Step 403, sending the goods grid where the material container is to a target AGV, for the target AGV to perform path planning and then acquire identifiers of materials in the material container.

After determining the goods grid where the material container is, the executing body may send the above goods grid to the target AGV. In this way, the target AGV may plan a path according to its own position and the position of the goods grid. Moreover, the target AGV may travel to the goods grid according to the above path, and take out the above material container. In this embodiment, the target AGV may be provided with a card reader, and each material in the material container may be provided with an RFID (radio frequency identification) tag. The above card reader can read the information of the RFID tag and send the above information to the executing body.

Step 404, determining, in response to receiving an electronic tag set read through a card reading device by the target AGV, identifiers corresponding to electronic tags in the electronic tag set, and statisticizing the identifiers.

Figure 5:
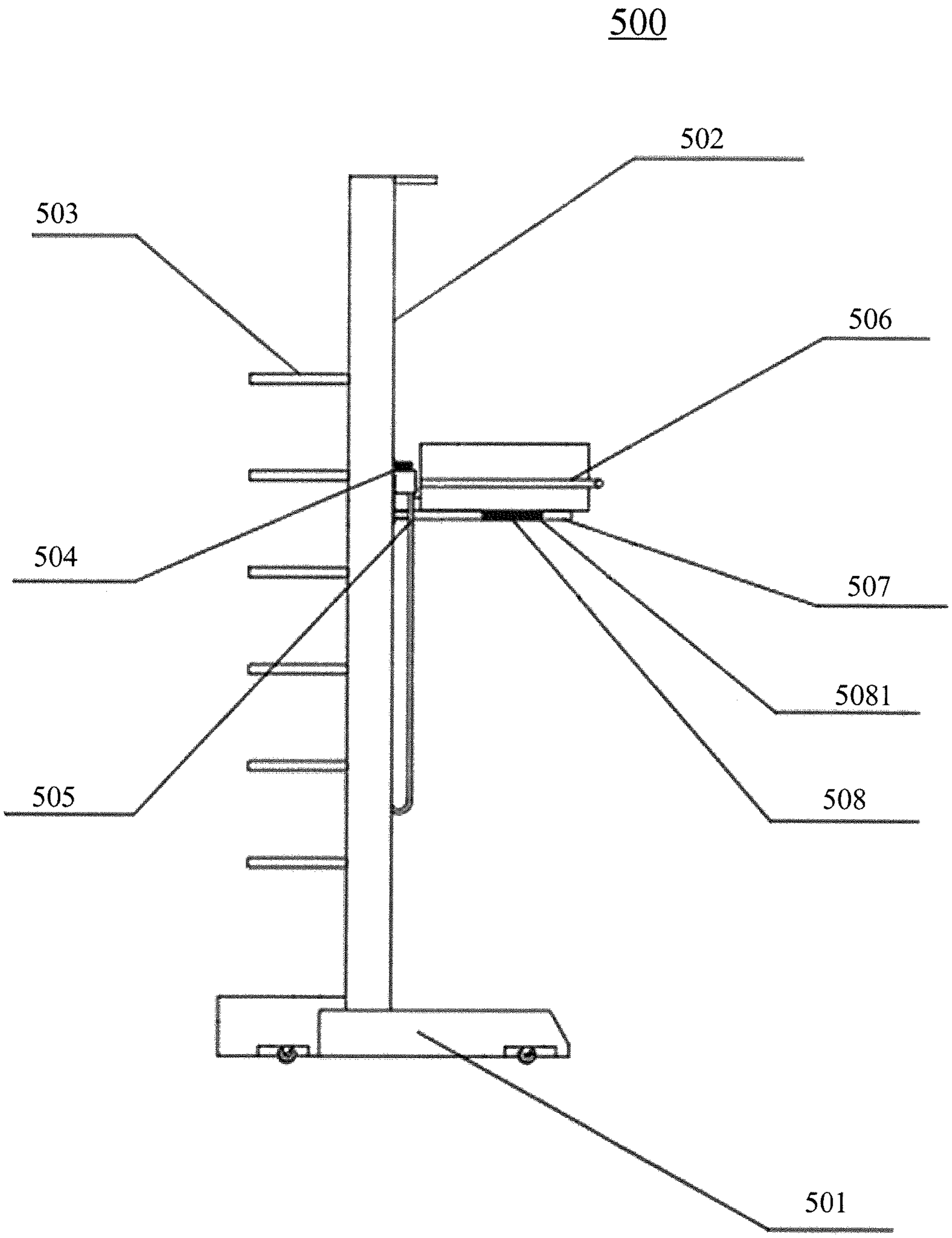
FIG. 5 is a schematic structural diagram of an AGV in a method for counting supplies according to in an embodiment of the present disclosure.

In this embodiment, the structure of the target AGV is as shown in FIG. 5. The structure of the target AGV may include an AGV base 501, a frame 502, a material container temporary storage location 503, a position sensor 504, an elevating apparatus 505, a telescopic arm 506, a material container pick-and-place location 507, and an RFID reader 508. Here, the AGV base 501 is provided with a mobile apparatus such as a wheel, and the frame 502 is used to fix the various components. The material container temporary storage location 503 is used to temporarily store a marked material container. The position sensor 504 is used to detect the position of the AGV. The telescopic arm 506 can telescope in and out to pick and place the material container. The telescopic arm 506 may place the picked material container on the material container pick-and-place location 507. The RFID reader 508 may be provided on the material container pick-and-place location 507, to read the identifiers of the materials in the material container. In some detailed applications, the above RFID reader 508 may be provided with a protective layer 5081 to protect the RFID reader 508.

The executing body may analyze and statisticize the electronic tag set read by the target AGV through the card reading device (e.g., the RFID reader), to determine the identifiers corresponding to electronic tags in the electronic tag set. In particular, the executing body May directly use the electronic tags as the identifiers, or determine the model numbers of the materials according to the electronic tags and use the model numbers as the identifiers. Finally, statisticizing is performed on the identifiers.

Step 405, in response to determining that a statistical result is consistent with a storage result, outputting a message for indicating that the storage result is correct.

If the executing body determines that the statistical result of materials in the material container is consistent with the storage result of the materials in the material container, it indicates that the storage result is correct. Accordingly, the executing body may output the message for indicating that the storage result is correct.

Step 406, marking the material container in response to determining that the statistical result is inconsistent with the storage result, and sending a marking result to the target AGV for the target AGV to move the material container to a temporary storage location.

In this embodiment, if the statistical result is inconsistent with the storage result, it indicates that the storage result is incorrect, and it is required to perform recounting. In order to avoid a decrease in the counting efficiency due to the movement of the material container with difference information, the executing body may first mark the above material container. In particular, the executing body may implement the marking on the material container by setting a tag for the original storage location of the material container. After the marking, the target AGV moves the material container to the temporary storage location. Here, the temporary storage location may be a position on the target AGV that is used for storing the material container. In this way, on the one hand, the target AGV can continue to perform the counting task, and on the other hand, it is possible to separate the material container with difference information from other material containers.

Step 407, generating a recounting task according to difference information between the statistical result and the storage result.

If the executing body affirms that the statistical result is inconsistent with the storage result, the difference information between the two results can be determined. Moreover, the recounting task is generated according to the above difference information.

When the recounting is performed, it can be determined whether the difference information is correct. The above difference information may include a difference between the identifiers of the materials, a difference in quantity, a difference in batch, and the like.

In some alternative implementations of this embodiment, the executing body may generate the recounting task by: determining a segregated storage location for storing the material container; and generating the recounting task according to the difference information and the segregated storage location.

In this implementation, if the storage result of the materials is incorrect, the executing body may first determine the segregated storage location for storing the material container. Then, the executing body may generate the recounting task according to the difference information and the segregated storage location. Here, the segregated storage location may be a storage location on which the material container with difference information is temporarily stored. The AGV may move the above material container from the original storage location to the above segregated storage location.

The executing body may determine the segregated storage location by: determining the segregated storage location according to distances between storage locations in each lane way and a roller conveyor line.

In this embodiment, the executing body may determine the distances between storage locations in each lane way in the warehouse and the roller conveyor line, and determine the segregated storage location according to the above distances. In particular, the executing body may rank storage locations according to the distances between storage locations and the roller conveyor line in a descending order. The first N storage locations in the above ranking are used as segregated storage locations.

In some other implementations, the executing body may use a storage location located at a high position in the storage locations of the same distance as the segregated storage location.

After determining the segregated storage location, the executing body may send the position of the segregated storage location to the target AGV. Accordingly, the target AGV may transport the material container from the temporary storage location to the segregated storage location when a preset carrying condition is satisfied. The above preset carrying condition May include, but not limited to, the temporary storage location being fully occupied, the counting task being completed, and the like.

In some alternative implementations of this embodiment, the number of segregated storage locations is the same as or in a multiple times relationship with the number of temporary storage locations. For example, if the number of the temporary storage locations in the AGV is 5, the number of the segregated storage locations in a single lane way may be 5, 10, 15, etc. . . . Accordingly, the AGV can place the material containers on the temporary storage locations therein on the segregated storage locations at a time.

Step 408, sending, in response to a preset recounting condition being satisfied, a carrying instruction to the target AGV, for the target AGV to carry the material container stored on the segregated storage location to a roller conveyor line for transportation to a counting workstation to perform recounting.

In this embodiment, the executing body may further send the carrying instruction to the target AGV when the preset recounting condition is satisfied. Here, the recounting condition may include, but not limited to, the arrival of a worker at the counting workstation, reaching the work start time for the warehouse, and the like. After receiving the carrying instruction, the target AGV may carry the material container stored on the segregated storage location to the roller conveyor line for transportation to the counting workstation to perform the recounting.

According to the method for counting supplies provided in the above embodiment of the present disclosure, when storage result of the materials in the material container is incorrect, the AGV may be controlled to temporarily store the material container on the temporary storage location, and to carry the material container to the segregated storage location in a certain situation. Moreover, the recounting task is generated according to the segregated storage location, for a counting worker to further count the materials.

Figure 6:
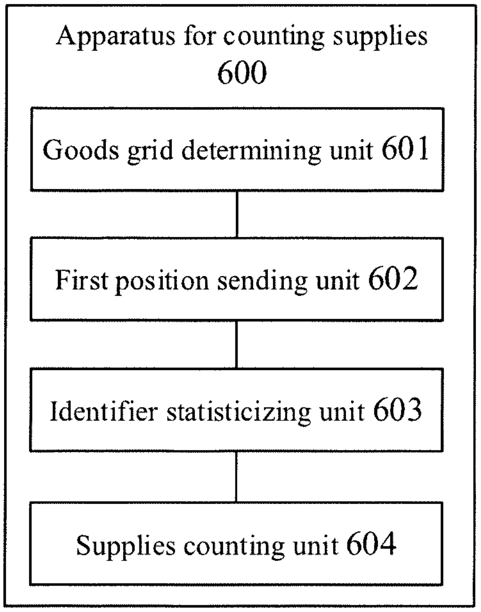
FIG. 6 is a schematic structural diagram of an apparatus for counting supplies according to an embodiment of the present disclosure.

Further referring to FIG. 6, as an implementation of the method shown in the above drawings, an embodiment of the present disclosure provides an apparatus for counting supplies. The embodiment of the apparatus corresponds to the embodiment of the method shown in FIG. 2. The apparatus may be applied in various electronic devices.

As shown in FIG. 6, the apparatus 600 for counting supplies in this embodiment comprises: a goods grid determining unit 601, a first position sending unit 602, an identifier statisticizing unit 603 and a supplies counting unit 604.

The goods grid determining unit 601 is configured to determine, in response to receiving a counting task for supplies in a warehouse, a goods grid where a material container corresponding to the counting task is.

The first position sending unit 602 is configured to send the goods grid where the material container is to a target automated guided vehicle (AGV), for the target AGV to perform path planning and acquire identifiers of materials in the material container.

The identifier statisticizing unit 603 is configured to statisticize, in response to receiving the identifiers of the materials in the material container that are sent by the target AGV, the identifiers to obtain a statistical result.

The supplies counting unit 604 is configured to compare the statistical result with a storage result of the materials in the material container and determining a supplies counting result according to a result of the comparing.

In some alternative implementations of this embodiment, the apparatus 600 may further comprise: a task receiving unit (not shown in FIG. 6), configured to determine that the counting task is received in response to determining that a preset task generation condition is satisfied.

In some alternative implementations of this embodiment, the goods grid determining unit 601 may be further configured to: in response to receiving the counting task for the supplies, determine whether a preset supplies counting condition is satisfied; in response to determining that the preset supplies counting condition is satisfied, determine the goods grid where the material container corresponding to the counting task is.

In some alternative implementations of this embodiment, the materials are provided with electronic tags, and the AGV is provided with a card reading device. The identifier statisticizing unit 603 may be further configured to determine, in response to receiving an electronic tag set read through the card reading device by the target AGV, the identifiers corresponding to electronic tags in the electronic tag set, and statisticize the identifiers.

In some alternative implementations of this embodiment, the supplies counting unit 604 may be further configured to output a message for indicating that the storage result is correct in response to determining that the statistical result is consistent with the storage result.

In some alternative implementations of this embodiment, the supplies counting unit 604 may be further configured to mark the material container in response to determining that the statistical result is inconsistent with the storage result, and sending a marking result to the target AGV for the target AGV to move the material container to a temporary storage location; and generate a recounting task according to difference information between the statistical result and the storage result.

In some alternative implementations of this embodiment, the supplies counting unit 604 may be further configured to determine a segregated storage location for storing the material container; and generate the recounting task according to the difference information and the segregated storage location.

In some alternative implementations of this embodiment, the warehouse comprises lane ways formed between a plurality of racks and a roller conveyor line for conveying materials. The supplies counting unit 604 may be further configured to determine the segregated storage location according to distances between storage locations in each lane way and the roller conveyor line.

In some alternative implementations of this embodiment, the supplies counting unit 604 may be further configured to determine, for each lane way, a preset number of segregated storage locations according to the distances between the storage locations in the lane way and the roller conveyor line.

In some alternative implementations of this embodiment, the apparatus 600 may further comprise: a second position sending unit (not shown in FIG. 6), configured to send a position of the segregated storage location to the target AGV for the target AGV to transport the material container from the temporary storage location to the segregated storage location when a preset carrying condition is satisfied.

In some alternative implementations of this embodiment, the apparatus 600 may further comprise: an instruction sending unit (not shown in FIG. 6), configured to send, in response to a preset recounting condition being satisfied, a carrying instruction to the target AGV, for the target AGV to carry the material container stored on the segregated storage location to the roller conveyor line for transportation to a counting workstation to perform recounting.

It should be understood that the units 601-604 in the apparatus 600 for counting supplies respectively correspond to the operations in the method described with reference to FIG. 2. Therefore, the operations and features described above for the method for counting supplies are also applicable to the apparatus 600 and the units contained therein, and thus will not be repeatedly described here.

In the technical solution of the present disclosure, the acquisition, storage, application, etc. of the personal information of a user all comply with the provisions of the relevant laws and regulations, and do not violate public order and good customs.

According to an embodiment of the present disclosure, an electronic device, a readable storage medium and a computer program product are provided.

Figure 7:
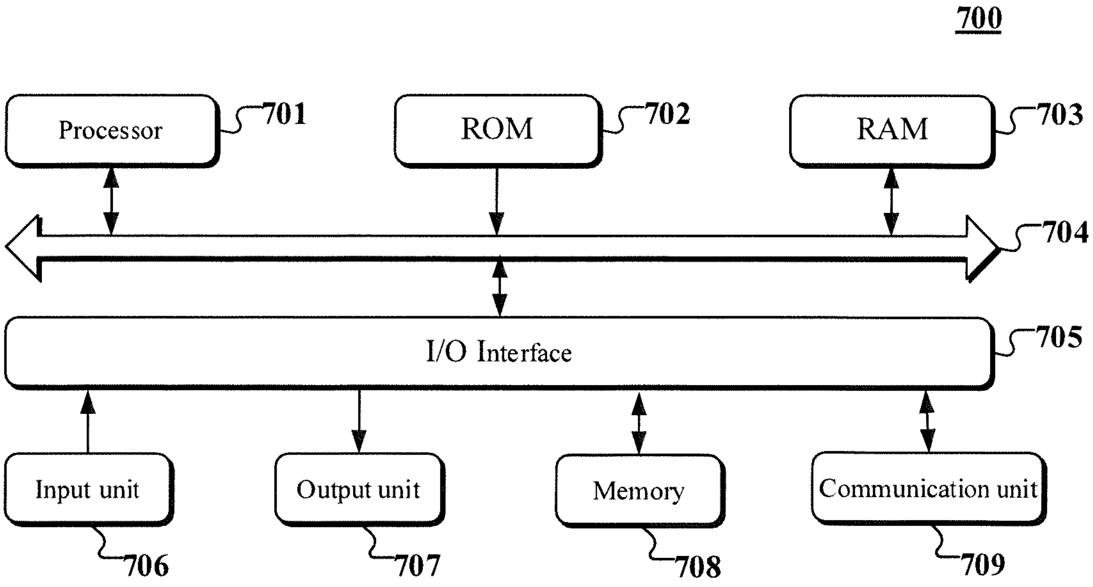
FIG. 7 is a block diagram of an electronic device used to implement the method for counting supplies according to embodiments of the present disclosure.

FIG. 7 is a block diagram of an electronic device 700 according to an embodiment of the present disclosure that performs the method for counting supplies. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit the implementations of the present disclosure described and/or claimed herein.

As shown in FIG. 7, the device 700 includes a computing unit 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The computing unit 701, the ROM 702 and the RAM 703 are connected to each other through a bus 704. An input/output (I/O) interface 705 is also connected to the bus 704.

A plurality of components in device 700 are connected to I/O interface 705, including an input unit 706, such as a keyboard, mouse, etc.; an output unit 707, such as various types of displays, speakers, etc.; a storage unit 708, such as magnetic disks, optical disks, etc.; and communication units 709, such as network cards, modems, wireless communication transceivers, etc. . . . The communication unit 709 allows device 700 to exchange information/data with other devices through computer networks such as the Internet and/or various telecommunications networks.

The computing unit 701 may be various general-purpose and/or special-purpose processing assemblies having processing and computing capabilities. Some examples of the computing unit 701 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. . . . The computing unit 701 performs the various methods and processes described above, for example, the method for counting supplies. For example, in some embodiments, method for counting supplies may be implemented as a computer software program, which is tangibly included in a machine readable medium, for example, the storage unit 708. In some embodiments, part or all of the computer program may be loaded into and/or installed on the device 700 via the ROM 702 and/or the communication unit 709. When the computer program is loaded into the RAM 703 and executed by the computing unit 701, one or more operations of the above method for counting supplies may be performed. Alternatively, in other embodiments, the computing unit 701 may be configured to perform the method for counting supplies through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. The above program codes may be packaged into a computer program product. These program codes may be provided to a processor or controller of a general-purpose computer, specific-purpose computer or other programmable data processing apparatus, so that the program codes, when executed by the processor 701, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The Server may be a cloud server, also known as cloud computing server or cloud host, solves the problems of difficult management and weak business expansibility in traditional physical host and VPS services ("Virtual Private Server", or referred to as "VPS"). The server can also be a server of a distributed system, or a server that incorporates a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for counting supplies, applied to a warehouse, the warehouse comprising lane ways formed between a plurality of racks, a roller conveyor line for conveying materials, and target automated guided vehicles (AGVs), two or more temporary storage locations being provided on each target AGV for temporarily storing one or more material containers, the method comprising:

determining, in response to receiving a counting task for supplies in a warehouse, a goods grid where a material container corresponding to the counting task is;

sending the goods grid where the material container is to a target AGV for the target AGV to perform path planning, and acquiring, by a card reading device provided on the target AGV, identifiers of materials in the material container;

statisticizing, in response to receiving the identifiers of the materials in the material container that are sent by the target AGV, the identifiers to obtain a statistical result;

comparing the statistical result with a storage result of the materials in the material container and determining a supplies counting result according to a result of the comparing; and in response to determining that the statistical result is inconsistent with the storage result, marking the material container and sending a marking result to the target AGV, and moving, by the target AGV, the material container to a temporary storage location located on the target AGV; determining, according to distances between storage locations in each lane way and the roller conveyor line, a segregated storage location for storing the material container from storage locations in the warehouse; sending a position of the segregated storage location to the target AGV, and transporting, by the target AGV, the material container from the temporary storage location to the segregated storage location in response to a preset carrying condition being satisfied; and sending, in response to a preset recounting condition being satisfied, a carrying instruction to the target AGV, and carrying, by the target AGV, the material container stored on the segregated storage location to the roller conveyor line for transportation to a counting workstation to perform recounting.

2. The method according to claim 1, further comprising:

determining that the counting task is received in response to determining that a preset task generation condition is satisfied.

3. The method according to claim 1, wherein the determining, in response to receiving the counting task for the supplies in the warehouse, the goods grid where the material container corresponding to the counting task is, comprises:

in response to receiving the counting task for the supplies, determining whether a preset supplies counting condition is satisfied; and in response to determining that the preset supplies counting condition is satisfied, determining the goods grid where the material container corresponding to the counting task is.

4. The method according to claim 1, wherein the materials are provided with electronic tags; and the statisticizing, in response to receiving the identifiers of the materials in the material container that are sent by the target AGV, the identifiers to obtain the statistical result, comprises:

determining, in response to receiving an electronic tag set read through the card reading device by the target AGV, the identifiers corresponding to electronic tags in the electronic tag set, and statisticizing the identifiers.

5. The method according to claim 1, wherein the comparing the statistical result with the storage result of the materials in the material container and determining the supplies counting result according to the result of the comparing, comprises:

in response to determining that the statistical result is consistent with the storage result, outputting a message for indicating that the storage result is correct.

6. The method according to claim 1, wherein the comparing the statistical result with the storage result of the materials in the material container and determining the supplies counting result according to the result of the comparing, comprises:

generating a recounting task according to difference information between the statistical result and the storage result.

7. The method according to claim 6, wherein the generating the recounting task according to the difference information between the statistical result and the storage result, comprises:

generating the recounting task according to the difference information and the segregated storage location.

8. The method according to claim 1, wherein the determining the segregated storage location for storing the material container comprises:

determining, for each lane way, a preset number of segregated storage locations according to the distances between the storage locations in the lane way and the roller conveyor line.

9. An apparatus for counting supplies, applied to a warehouse, the warehouse comprising lane ways formed between a plurality of racks, a roller conveyor line for conveying materials, and target automated guided vehicles (AGVs), two or more temporary storage locations being provided on each target AGV for temporarily storing one or more material containers, the apparatus comprising:

one or more processors; and a storage apparatus, storing one or more programs thereon, the one or more programs, when executed by the one or more processors, cause the one or more processors to implement operations, the operations comprising:

determining, in response to receiving a counting task for supplies in a warehouse, a goods grid where a material container corresponding to the counting task is;

sending the goods grid where the material container is to a target AGV for the target AGV to perform path planning, and acquiring, by a card reading device provided on the target AGV, identifiers of materials in the material container;

statisticizing, in response to receiving the identifiers of the materials in the material container that are sent by the target AGV, the identifiers to obtain a statistical result;

comparing the statistical result with a storage result of the materials in the material container and determining a supplies counting result according to a result of the comparing; and in response to determining that the statistical result is inconsistent with the storage result, marking the material container and sending a marking result to the target AGV, and moving, by the target AGV, the material container to a temporary storage location located on the target AGV: determining, according to distances between storage locations in each lane way and the roller conveyor line, a segregated storage location for storing the material container from storage locations in the warehouse; sending a position of the segregated storage location to the target AGV, and transporting, by the target AGV, the material container from the temporary storage location to the segregated storage location in response to a preset carrying condition being satisfied; and sending, in response to a preset recounting condition being satisfied, a carrying instruction to the target AGV, and carrying, by the target AGV, the material container stored on the segregated storage location to the roller conveyor line for transportation to a counting workstation to perform recounting.

10. A non-transitory computer readable storage medium, storing a computer instruction, wherein the computer instruction is used to cause the computer to perform operations applied to a warehouse, the warehouse comprising lane ways formed between a plurality of racks, a roller conveyor line for conveying materials, and target automated guided vehicles (AGVs), two or more temporary storage locations being provided on each target AGV for temporarily storing one or more material containers, the operations comprising:

determining, in response to receiving a counting task for supplies in a warehouse, a goods grid where a material container corresponding to the counting task is;

sending the goods grid where the material container is to a target AGV for the target AGV to perform path planning, and acquiring, by a card reading device provided on the target AGV, identifiers of materials in the material container;

statisticizing, in response to receiving the identifiers of the materials in the material container that are sent by the target AGV, the identifiers to obtain a statistical result;

comparing the statistical result with a storage result of the materials in the material container and determining a supplies counting result according to a result of the comparing; and in response to determining that the statistical result is inconsistent with the storage result, marking the material container and sending a marking result to the target AGV, and moving, by the target AGV, the material container to a temporary storage location located on the target AGV; determining, according to distances between storage locations in each lane way and the roller conveyor line, a segregated storage location for storing the material container from storage locations in the warehouse; sending a position of the segregated storage location to the target AGV, and transporting, by the target AGV, the material container from the temporary storage location to the segregated storage location in response to a preset carrying condition being satisfied; and sending, in response to a preset recounting condition being satisfied, a carrying instruction to the target AGV, and carrying, by the target AGV, the material container stored on the segregated storage location to the roller conveyor line for transportation to a counting workstation to perform recounting.

11. The apparatus according to claim 9, wherein the operations further comprise:

determining that the counting task is received in response to determining that a preset task generation condition is satisfied.

12. The apparatus according to claim 9, wherein the determining, in response to receiving the counting task for the supplies in the warehouse, the goods grid where the material container corresponding to the counting task is, comprises:

in response to receiving the counting task for the supplies, determining whether a preset supplies counting condition is satisfied; and in response to determining that the preset supplies counting condition is satisfied, determining the goods grid where the material container corresponding to the counting task is.

13. The apparatus according to claim 9, wherein the materials are provided with electronic tags; and the statisticizing, in response to receiving the identifiers of the materials in the material container that are sent by the target AGV, the identifiers to obtain the statistical result, comprises:

determining, in response to receiving an electronic tag set read through the card reading device by the target AGV, the identifiers corresponding to electronic tags in the electronic tag set, and statisticizing the identifiers.

14. The apparatus according to claim 9, wherein the comparing the statistical result with the storage result of the materials in the material container and determining the supplies counting result according to the result of the comparing, comprises:

in response to determining that the statistical result is consistent with the storage result, outputting a message for indicating that the storage result is correct.

15. The apparatus according to claim 9, wherein the comparing the statistical result with the storage result of the materials in the material container and determining the supplies counting result according to the result of the comparing, comprises:

generating a recounting task according to difference information between the statistical result and the storage result.

* * * * *